United States Patent [19]
Martin

[11] 3,923,374
[45] Dec. 2, 1975

[54] HIGH SPEED ELECTRO-OPTIC WAVEGUIDE MODULATOR

[75] Inventor: William E. Martin, San Diego, Calif.

[73] Assignee: The United States of America as represented by the Secretary of the Navy, Washington, D.C.

[22] Filed: July 22, 1974

[21] Appl. No.: 490,461

[52] U.S. Cl.......... 350/96 WG; 350/150; 350/160 R
[51] Int. Cl.² ...................... G02B 5/14; G02F 1/03
[58] Field of Search .................. 350/96 WG, 160 R

[56] References Cited
UNITED STATES PATENTS

| | | | |
|---|---|---|---|
| 3,674,337 | 7/1972 | Marcatili | 350/96 WG |
| 3,785,717 | 1/1974 | Croset et al. | 350/96 WG |
| 3,795,433 | 3/1974 | Channin | 350/96 WG |
| 3,810,688 | 5/1974 | Ballman et al. | 350/96 WG |

OTHER PUBLICATIONS

Martin et al., "Optical Waveguides by Diffusion II–VI Compounds" *Applied Physics Letters*, Vol. 21, No. 7, Oct. 1972, pp. 325–327.
Kaminow et al., "Thin–Film LiNbO₃ Electro-Optic Light Modulator" *Applied Physics Letters*, Vol. 22, No. 10, May 1973, pp. 540–542.

*Primary Examiner*—John K. Corbin
*Attorney, Agent, or Firm*—R. S. Sciascia; G. J. Rubens; J. W. McLaren

[57] ABSTRACT

An optical waveguide for transmitting light energy is defined by a channel of diffusant in a selected substrate material. An electrical conductor is positioned proximate to each side of the optical waveguide channel and a source of electrical signals is connected to the electrical conductors to develop an electrical field across the optical waveguide, producing resultant changes in refractive index commensurate with the electrical signals impressed upon the parallel electrical conductors. The changes of refractive index cause changes in polarization of light energy transmitted through that portion of the optical waveguide so that such light energy is phase modulated. In a preferred waveguide electro-optic modulator assembly, polarized light energy transmitted by the optical waveguide may undergo a change of polarization which, when intercepted by a polarization-sensitive filter, will produce an amplitude modulation of the light energy transmitted by the assembly.

9 Claims, 6 Drawing Figures

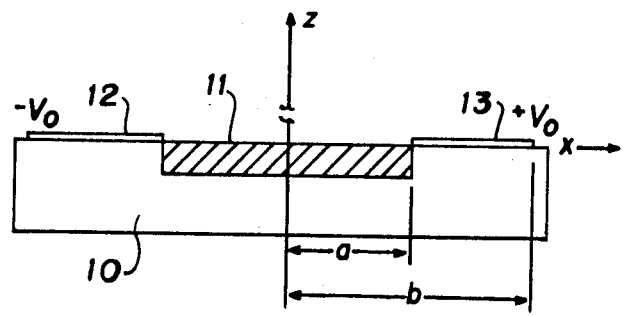
FIG. 1a
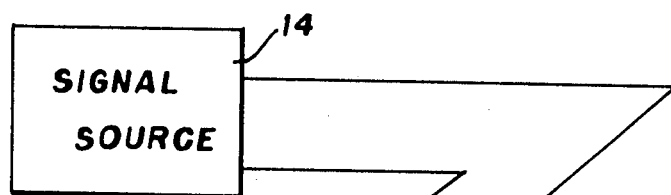
FIG. 1b
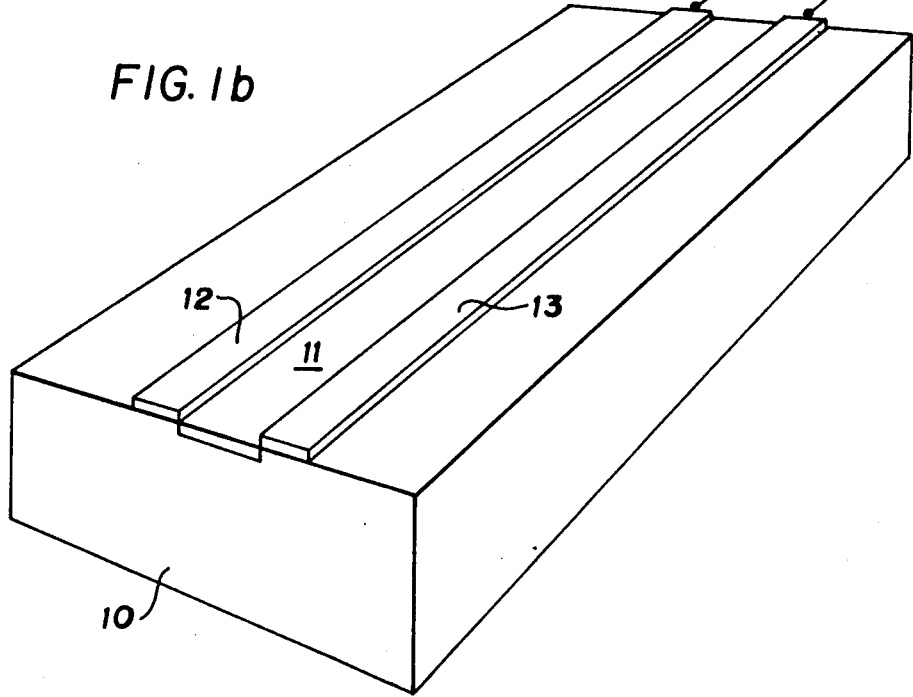

FIG. 2
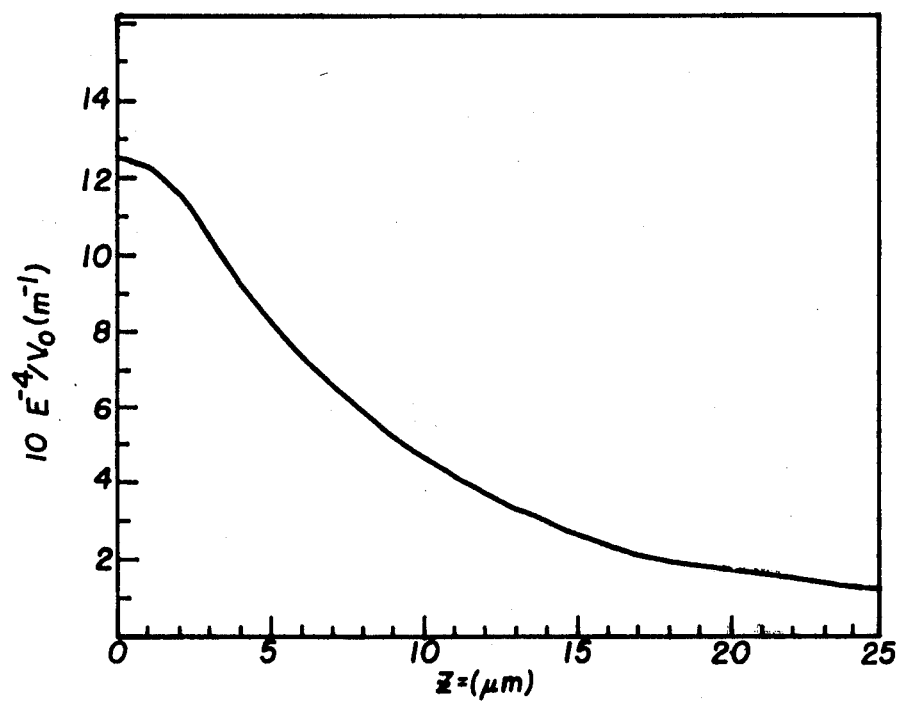
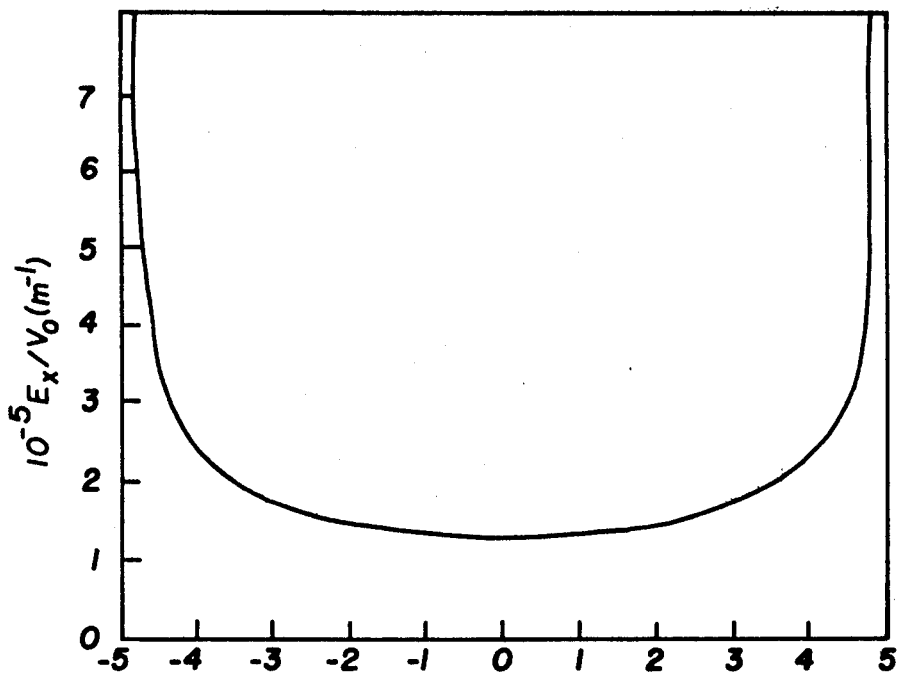
FIG. 3

HIGH SPEED ELECTRO-OPTIC WAVEGUIDE MODULATOR

BACKGROUND OF THE INVENTION

Electro-optic intensity modulators employing bulk crystals are well known as has been reported by R. P. Kaminow and E. H. Turner in the proceedings of IEEE Volume 54, beginning at page 1374. Waveguide electro-optic modulators are, however, much less well known. Several of the latter in varying types and configurations have been reported by F. K. Reinhart in the Journal of Applied Physics Volume 39, beginning at page 3426, by D. Hall, A. Yariv, and E. Garmire in Optic Communications, Volume 1, beginning at page 403, by F. K. Reinhart and B. I. Miller in Applied Physics Letters, Volume 20, beginning at page 36, and by J. N. Polky and J. H. Harris in Applied Physics Letters, Volume 7, at page 307.

One of the principal advantages of an optical waveguide configuration as contrasted to bulk crystals is that much higher intensity electric fields may be used with the optical waveguide configuration and also much lower capacitive values may be realized. Both of these operative characteristics are necessary to achieve desirably very high speed operation of such electro-optic modulators. Though the waveguide electro-optic modulator configurations of the prior art, including those referenced hereinbefore, have partially availed of the potential advantages of the waveguide configuration, they have inherently possessed much higher capacitive values and/or larger physical geometries than those achieveable in accordance with the concept and teaching of the present invention. As a consequence, the present invention provides the advantage of significantly higher efficiency, due to the small dimensions of the waveguide modulator, and also extremely high operational speeds due to its inherent very low capacitance.

Accordingly, the present invention affords highly desirable advantages and features which are necessary to the enhanced operation of optical data transmission and communications systems.

SUMMARY OF THE INVENTION

A waveguide electro-optic modulator of the present invention may preferably comprise a substrate material of a II–VI compound in which an optical waveguide is defined within the physical limits of a channel of diffusant which is diffused into a predetermined portion of the substrate material. The diffusant is a selected element chosen from the groups II and VI of the periodic table of elements.

An electrical conductor is disposed proximate to each side of the channel of diffusant which comprises the optical waveguide, and such electrical conductors may consist of deposited metallic or other electrically conductive material.

A source of electrical signals is arranged to be connectable to the electrical conductors disposed parallel to the optical waveguide defined by the channel of diffusant for developing an electrical field across the optical waveguide.

The electrical field developed in response to the applied electrical signals causes a commensurate change in refractive index within the optical waveguide comprising the channel of diffusant in the predetermined portion of the substrate material. The changes in refractive index thus caused give effect to correlative changes in polarization or phase of the light energy passing through the optical waveguide.

When polarized light energy is transmitted through the optical waveguide modulator it accordingly undergoes changes in polarization or phase commensurate with the electrical signals applied to the electrodes which parallel the optical waveguide comprising the channel of diffusant.

A preferred waveguide electro-optic modulator assembly of the present invention may embody a source of polarized light energy disposed for transmission by the waveguide electro-optic modulator and a polarization-sensitive filter or analyzer positioned to intercept the light energy transmitted by the waveguide electro-optic modulator. Such source of light energy may comprise a laser together with a suitable polarizing filter positioned and arranged to transmit its light energy through the wave guide electro-optic modulator of the present invention. The polarization-sensitive filter or analyzer may be positioned to intercept the emerging light energy transmitted by the electro-optic modulator for the purpose of converting changes in phase or polarization of the emergent light energy to commensurate changes in amplitude of the light energy transmitted by the polarization-sensitive filter or analyzer.

Accordingly, it is a primary object of the present invention to provide an electro-optic modulator which is capable of extremely high speed operation.

A concomitant object of the present invention is to provide an electro-optic modulator of extremely small physical size.

A further and equally important object of the present invention is to provide such an electro-optic modulator which is suitable for applications in integrated optical circuitry.

Yet another object of the present invention is to provide an electro-optic modulator which may be readily adapted to intensity or phase modulation of light energy.

A further object of the present invention is to provide such an electro-optical modulator which will interface directly with single mode fiber optic transmission lines.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1a is a greatly enlarged cross sectional view of an embodiment of the present invention;

FIG. 1b is a perspective view of an embodiment of the present invention;

FIG. 2 is an illustration of typical electric field variation in the Z direction developed as a result of electrical signals applied to an embodiment of the present invention;

FIG. 3 is a graphical illustration of typical electric field variation in the X direction developed as a result of electrical signals applied to an embodiment of the present invention;

DESCRIPTION OF THE PREFERRED EMBODIMENTS

Figure 4:
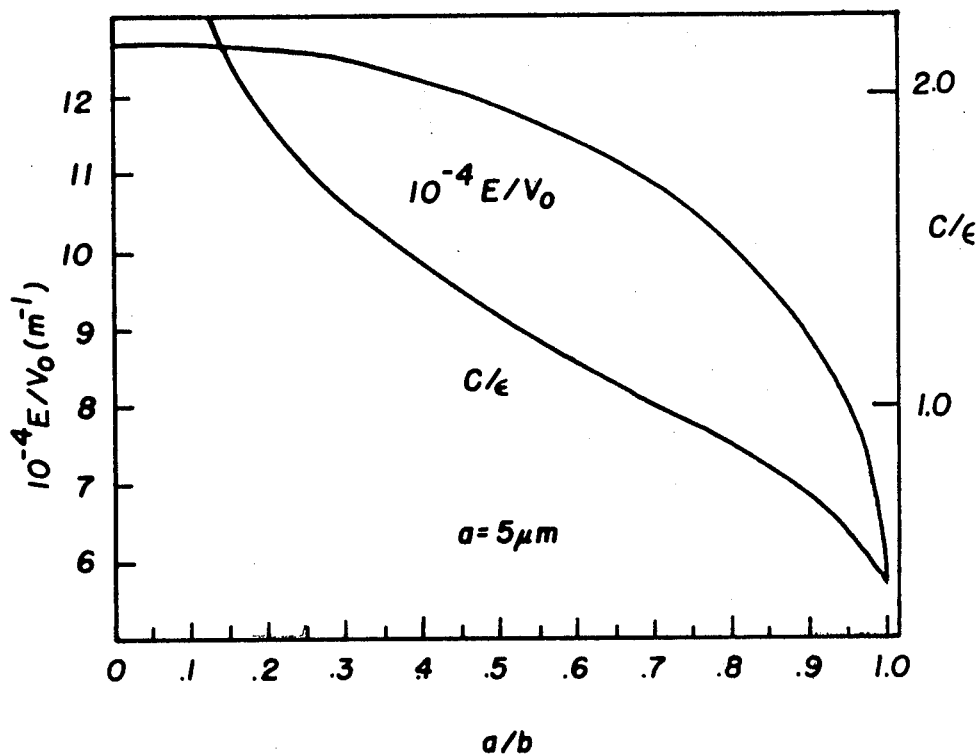
FIG. 4 is a graphical illustration of typical electric field developed and the capacitive values vs. electrode aspect ratio.

FIG. 1a is a cross sectional view of an embodiment of the present invention in which parallel electrodes are employed to develop an electrical field in the X direction and propagation of light energy is in a direction perpendicular to the plane of the drawing.

In FIG. 1a, a substrate material 10 is diffused with a diffusant 11 along a channel which defines an optical waveguide in a predetermined portion of the substrate material. Suitable substrates include the sulfides, selenides and tellurides of zinc and cadmium, for example. However, other compounds of II–VI elements may be employed within the concept of the present invention. Suitable diffusants include sulfur, selenium, tellurium, cadmium, and zinc. It should be understood, however, that the concept of the present invention requires only that the diffusant be an element chosen from the groups II and VI of the periodic table of elements, and diffusants other than those named herein may be chosen and employed within the broader concepts of the present invention.

The diffusion of a selected diffusant material within a predetermined channel portion of the substrate material may be accomplished in a number of ways, including those diffusing techniques disclosed in the scientific article by H. F. Taylor, W. E. Martin, D. B. Hall, and V. N. Smiley appearing in the Applied Physics Letters, Volume 21, at page 95, and also the scientific article by W. E. Martin and D. B. Hall appearing in Applied Physics Letters, Volume 21, at page 325. Other suitable diffusing techniques may be employed, however, without departing from the spirit, concept, and teaching of the present invention.

Electrical conductors as illustrated in FIG. 1a at 12 and 13 may comprise a deposited metallic film disposed proximate to each side of the channel of diffusant 11.

FIG. 1b is a perspective illustration of a typical embodiment of the present invention greatly enlarged for purposes of clarity of explanation and understanding. (In FIG. 1b like elements bear the same numerical designations as in FIG. 1a.) From FIG. 1b it will be seen that the substrate material 10 includes an optical waveguide 11 as defined by a channel of diffusant in a predetermined central portion of the substrate material.

An electrical conductor is disposed proximate to each side of the channel of diffusant 11 in parallel relationship thereto as shown at 12 and 13. Additionally, a source of electrical signals 14 is arranged to be connected to the electrical conductors 12 and 13 for developing an electrical field across the optical waveguide comprising the channel of diffusant for modulating light energy passing through the optical waveguide by changing its refractive index responsive to the electrical signals received from the signal source 14.

The changes in electric field developed across the optical waveguide changes the refractive index of the material so that polarized light passing along the optical waveguide undergoes a change in phase or polarization commensurate with the electrical signals developed by the signal source 14. Accordingly, the modulator as illustrated in FIG. 1a and 1b will function to modulate light energy in accordance with applied electrical signals.

FIG. 2 illustrates variation in electric field in the Z direction of FIG. 1a in response to changes in applied signals.

FIG. 3 illustrates variation in electric field in the X direction of FIG. 1a in response to changes in the applied signal.

FIG. 4 illustrates the variation of capacitance relative to variation of the electrodes aspect ratio.

Figure 5:
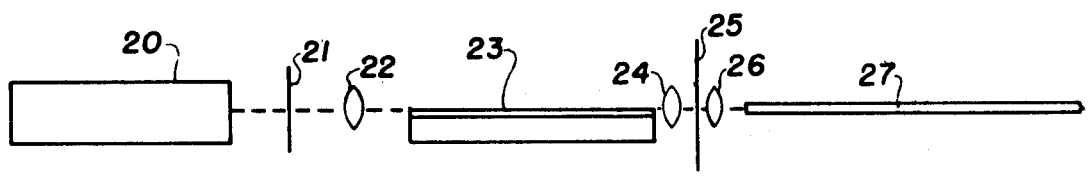
FIG. 5 is a schematic representation of a preferred waveguide electro-optic modulator assembly embodying the present invention.

FIG. 5 illustrates a preferred modulator assembly including a light source and a fiber optic transmission line as well as the modulator of the present invention.

In FIG. 5 a suitable source of light energy 20 may comprise a laser, for example. If the light emitted by the laser 20 is not polarized, a suitable polarizer 21 may be employed to polarize the laser energy emitted from the laser assembly 20.

A conventional lens 22 may be employed to direct the laser energy to the waveguide portion of the modulator 23 of the present invention. The lens 22 may be of a conventional type or a commercially available graded refractive index rod if it is desired to match the geometry of the device.

The modulator operates to optically modulate light energy passing therethrough in response to electrical signals as previously described in connection with FIGS. 1a and 1b. Such modulation is of a phase or polarization character and the modulated light energy passes through a lens 24 and thence to an analyzer-polarizer which operates to selectively pass only light energy of predetermined polarization. Accordingly, the changes in polarization affected by the modulator 23 may be converted to commensurate changes in amplitude of light energy upon passing through the analyzer-polarizer filter 25.

Such modulated light energy then passes through a lens 26, whence it may be further transmitted along an optical path 27 which may comprise a fiber optic bundle or single fiber transmission line of an optical data transmission or communications system.

For a particular electro-optic material, phase changes in polarization of light energy traversing the optical waveguide comprising the channel of diffusant may be determined by the crystal structure of the diffused substrate orientation of light propagation direction, and electric field direction.

For cubic crystals ($\bar{4}3m$) with the $<001>$ axis parallel to z, and the (110) plane in the plane of FIG. 1a, the phase difference between two orthogonal polarizations at 45° to $x$ and $z$ may be expressed as, $$\lambda = 2 \frac{\pi}{\lambda} n_0^3 r_{41} l E_x$$

Where $\lambda$ is the free-space wavelength of the light used, $n_o$ the guide refractive index, $r_{41}$ the electro-optic coefficient, $l$ the length of the waveguide (in the $y$ direction) and $E_x$ the applied field. The refractive index changes induced in the axes ($x'$, $z'$) rotated 45° with respect to $x$ and $z$ are $$n_{z'} = n_0 - \frac{n_0^3}{\lambda_0} r_{41} E_x$$

$$n_{x'} = n_0 - \frac{n_0^3}{\lambda_0} r_{41} E_x$$

An important advantage is the very low capacitances possible with such a structure. Using conformal mapping techniques as disclosed in the publications Dictionary of Conformal Representations, Dover New York, (1957) by H. Kober, and Mathematical Methods of Physics, Benjamin, New York (1965), Chap. 5 by J. Mathews and R. L. Walker, the capacitance per unit length is determined to be $$c = E \frac{K'(a/b)}{K(a/b)}$$

where $E$ is the dielectric permittivity of the waveguide, and $K'$ and $K$ are the complete elliptic integrals.

For ZnSe and $a/b \times \frac{1}{3}$ (equal electrode width and spacing) with air at $z>0$, the capacitance is found to be $c \approx 0.7 pf/cm$
which is almost an order of magnitude smaller than other comparable optical waveguide modulator configurations. FIGS. 2 and 3 show the electric field variations in the $z$ and $x$ directions respectively. At $x=0$, the field variation in the $z$ direction is given by $$E_z = \frac{bV_0}{K(a/b)}[(z^2 + a^2)(z^2 + b^2)]^{-1/2}$$

At $z=0$, the field variation in the $x$ direction is given by $$E_x = \frac{bV_0}{K(a/b)}[(x^2 - a^2)(x^2 - b^2)]^{-1/2}$$

FIG. 4 plots capacitance and electric field at $x = z = 0$ versus $a/b$. For optimum performance (highest intensity electric field with smallest capacitance) $a/b$ should be about 0.5.

One of the principal advantages and features of the present invention is the highly desirable increased efficiency of operation which is due to the small dimensions of the optical waveguide portion of the modulator which may typically be of the order of 2 × 10 microns. Moreover, such small dimensions produce a commensurately relatively very low capacitance of the device permitting extremely high operational speeds.

Waveguide electro-optic modulators of the prior art have generally required voltages of the order of somewhat less than 100 volts but their relatively large distributed capacitance limited their speed of operation to signals of the order of 500MHz.

The present invention, however, has the most desirable advantage of requiring very low voltage, i.e., less than 50 volts, and extremely low capacitance which provides operation at signal frequencies above 1GHz. Moreover, due to the very small dimensions of the optical waveguide modulators of the present invention direct interface with high bandwidth, single mode, fiber optic transmission lines is made feasible.

Within the concept of the present invention alternate methods of fabrication of the channel optical waveguide portion of the modulator are possible by which it can be diffused, ion implanted, ion beam machined, mechanically etched or achieved by numerous other methods suitable to meet the conceptional requisites of the present invention.

Additionally, typical embodiments of the present invention can be fabricated which are operative from the near ultra-violet wavelengths to the far infra-red wavelengths depending on the particular properties of differing optical waveguide compositions, affording an extremely broad range of usefulness.

Obviously many modifications and variations of the present invention are possible in the light of the above teachings. It is therefore to be understood that within the scope of the appended claims the invention may be practiced otherwise than as specifically described.

What is claimed is:

1. A channel waveguide electro-optic modulator comprising:
   a substrate material of a II–VI compound;
   an optical waveguide having a predetermined uniform width defined by a channel of diffusant in a portion of said substrate material,
   said diffusant being an element chosen from the groups II and VI of the periodic table of elements;
   an electrical conductor of predetermined uniform width disposed proximate to and parallel with each side of said channel of diffusant, the ratio of the width of said optical waveguide to the width of each said electrical conductor being substantially of the order of 2:1; and
   a source of electrical signals connectable to said electrical conductors and developing an electric field across said optical waveguide for modulating light energy passing therethrough by changes in refractive index commensurate with said electrical signals.

2. A waveguide electro-optic modulator as claimed in claim 1 wherein said diffusant is selected for increasing the refractive index within said channel.

3. A waveguide electro-optic modulator as claimed in claim 1 wherein said diffusant is selected for increasing the refractive index within said channel by a predetermined amount.

4. A waveguide electro-optic modulator as claimed in claim 1 wherein said diffusant is diffused into said channel in an amount to produce a predetermined increase in the refractive index of said channel.

5. A waveguide electro-optic modulator as claimed in claim 1 wherein said substrate is a compound from the group comprising the sulfides, selenides, and tellurides of zinc and cadmium.

6. A waveguide electro-optic modulator as claimed in claim 1 wherein said diffusant is an element from the group comprising sulfur, selenium, tellurium, cadmium, and zinc.

7. A waveguide electro-optic modulator as claimed in claim 1 wherein said electrical conductors comprise metallic films deposited on said substrate.

8. An electro-optic modulator assembly including the waveguide electro-optic modulator as claimed in claim 1 and comprising:
   a source of polarized light energy disposed for transmission by said modulator; and
   a polarization-sensitive filter positioned to intercept the light energy transmitted by said modulator.

9. An electro-optic modulator assembly as claimed in claim 8 wherein said source of polarized light energy comprises a source of coherent light and a polarizer means.

* * * * *